United States Patent [19]

Cowling et al.

[11] 3,870,559
[45] Mar. 11, 1975

[54] PAPER TREATMENT
[75] Inventors: Ronald Cowling; James Nairn Greenshields, both of Manchester, England
[73] Assignee: Imperial Chemical Industries Limited, London, England
[22] Filed: Nov. 23, 1973
[21] Appl. No.: 418,184

Related U.S. Application Data
[63] Continuation of Ser. No. 115,844, Feb. 16, 1971, abandoned.

[30] Foreign Application Priority Data
Feb. 25, 1970 Great Britain .................... 9115/70

[52] U.S. Cl. ................ 117/201, 96/1.5, 117/155 R, 117/155 UA, 117/161 UN
[51] Int. Cl. ........................... B44d 1/18, G03g 7/00
[58] Field of Search .. 117/155 R, 155 UA, 161 UN, 117/201, DIG. 4; 162/138; 96/1.5

[56] References Cited
UNITED STATES PATENTS
3,486,932  12/1969  Schaper et al. .................... 117/201
3,544,318  12/1970  Boothe et al. ..................... 117/201
3,615,408  10/1971  Taubman ............................. 96/1.5
3,617,372  11/1971  McNamee et al. ................. 117/201
3,619,284  11/1971  Ray-Chaudhuri et al. ......... 117/201
3,640,766   2/1972  Jursich et al. ..................... 117/201

Primary Examiner—Daniel J. Fritsch
Attorney, Agent, or Firm—Cushman, Darby & Cushman

[57] ABSTRACT

A method of improving the electroconductivity of paper comprising applying to at least one surface of the paper an aqueous solution of a polymer or copolymer of a quaternary ammonium chloride or acetate derived from an aminoalkyl acrylate or methacrylate, the polymer or copolymer having an average molecular weight in the range 5,000 to 2,000,000. The treated paper is suitable as base paper for electrographic printing.

3 Claims, No Drawings

PAPER TREATMENT

This is a continuation, of application Ser. No. 115,844 filed Feb. 16, 1971 now abandoned.

This invention relates to a method of paper treatment and more particularly to a method of improving the electroconductivity of paper.

It has already been proposed to provide paper suitable for use in various copying processes by treating the paper with materials to improve the electroconductivity.

The present invention provides a method of improving the electroconductivity of paper which comprises applying to at least one surface of the paper an aqueous solution of a polymer or copolymer containing in the molecule repeating units of the formula:

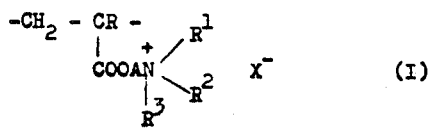

wherein R represents hydrogen or methyl, $R^1$ represents methyl or ethyl, $R^2$ and $R^3$ each independently represents methyl or ethyl or $R_2$ and $R_3$ taken together represent $-CH_2CH_2\ OCH_2CH_2-$ or $-(CH_2)n-$ where $n$ represents 4, 5 or 6, A represents alkylene or substituted alkylene and $X^-$ represents a chloride or acetate ion, said polymer or copolymer having an average molecular weight in the range 5,000 to 2,000,000.

Preferably the polymer or copolymer has a molecular weight of from 10,000 to 500,000.

Alkylene radicals which may be represented by A in Formula I include ethylene. Substituted alkylene radicals include hydroxy-substituted alkylene radicals, for example 2-hydroxytrimethylene.

The polymers or copolymers to be used in the method of the present invention may be prepared by the free radical catalysed polymerisation of a monomer $CH_2=CRCOOAN^+R^1R^2R^3.\ X^-$, optionally with a further vinyl monomer, or by the free radical catalysed polymerisation of $CH_2=CRCOOANR^1R^2$ optionally in the presence of a further vinyl monomer followed by quaternisation of the polymer or copolymer with a suitable quaternising agent.

Suitable copolymers for use according to the present invention preferably contain at least 15% on a weight basis of units of Formula I. Co-monomers of the vinyl series which may be used in preparing the copolymers include styrene, methyl methacrylate, methyl acrylate, ethyl acrylate, butyl acrylate, ethylhexyl acrylate, acrylonitrile, vinyl toluene, vinyl acetate, β-ethoxyethyl methacrylate, β-hydroxyethyl methacrylate, ethylene glycol dimethacrylate, acrylamide, diacetone acrylamide, ethylene, propylene and divinyl benzene.

In the case of copolymers utilising as the co-monomer one which forms a water-insoluble polymer, the proportion of the said co-monomers must be such that the copolymers are soluble in water.

Unexpectedly, it has been found that copolymers having a comparatively high proportion of non-quaternary units can increase the conductivity of paper substantially as effectively as a quaternary homopolymer. Particularly useful non-quaternary units in this respect are those formed by the use of styrene, vinyl toluene, 2-ethylhexyl acrylate and methyl methacrylate. Copolymers contain 15–80% by weight of units of Formula I are both effective and economically attractive.

In addition to the economic advantages which can be gained by using a cheap non-quaternary comonomer, a further and unexpected advantage can accrue, that is an improvement in "solvent holdout". Solvent holdout is a measure of the treated paper's ability to prevent penetration of organic solvents into the paper. A good solvent holdout is required in a commercial Electrofax base paper to prevent penetration of the solvent-borne photoconductive agent into the electroconductive base paper.

The solution of polymer or copolymer may be applied to the paper by any convenient method, for example by coating, dipping, brushing or wet end addition. The polymer or copolymer may be applied from an aqueous solution or an aqueous composition containing the polymer or copolymer together with one or more additives which may improve the application properties or the properties of the finished paper. Suitable additives include starch, water-soluble cellulose derivatives, polyvinyl alcohol, calcium carbonate and pigments. The amount of polymer or copolymer to be applied to give the desired electroconductive properties may be easily determined by trial.

Paper treated according to the method of the present invention is particularly suitable as a base paper for electrographic printing.

The invention is illustrated but not limited by the following Examples in which all parts and percentages are by weight.

EXAMPLE 1

A sized bleached chemical wood pulp paper of 70g. per sq. metre is coated on one surface with a 3.7% aqueous solution of a poly(trimethyl-β-methacryloyloxyethyl ammonium chloride), having a number average molecular weight of 52,000 to give a coating weight of 1g./sq. metre (expressed as dry polymer solids). After standing for 48 hours in a cabinet having a circulating atmosphere at 20°C. and 20% relative humidity, the surface resistance is measured between two 1 inch square brass electrodes, at a potential difference of 500 volts DC, placed 1 inch apart on the treated surface of the paper. The resistance is found to be $3.9 \times 10^8$ ohm.

For comparison the untreated paper and a paper coated in the same manner as above, but using Calgon 261, a commercially available product, (Calgon is a Trade Mark of Calgon Corp.) are tested, giving $3 \times 10^{11}$ ohm and $6 \times 10^8$ ohm respectively.

EXAMPLE 2

The surface resistivities of paper coated and tested as in Example 1 are given in the following table.

| Polyquaternary | number average molecular weight | coating weight g/ sq. metre | surface resistivity (ohms) |
|---|---|---|---|
| Copolymer of equimolar amounts trimethyl β-methacryloyloxyethyl ammonium chloride and styrene | — | 1<br>2 | $9.0 \times 10^8$<br>$1.7 \times 10^8$ |
| Poly(diethyl methyl β-methacryloyloxyethyl ammonium acetate) | ca. 150,000 | 1 | $17 \times 10^8$ |
| Poly(methyl-β-methacryloyloxyethyl pyrrolidinium chloride) | 162,000 | 1<br>2 | $2.3 \times 10^8$<br>$0.44 \times 10^8$ |
| poly(methyl-β-methacryloyloxyethyl piperidinium chloride) | 138,000 | 1 | $28 \times 10^8$ |
| poly(diethyl methyl-β-methacryloyloxyethyl ammonium chloride | 400,000 | 1 | $9.3 \times 10^8$ |
| poly(methyl-62-methacryloyloxyethyl morpholinium chloride) | 42,000 | 1 | $53 \times 10^8$ |

EXAMPLE 3

The surface resistivities at 20% relative humidity of paper coated at 1 gm$^{-2}$ with various copolymers and a homopolymer for comparison are presented in the following table.

EXAMPLE 4

Solvent hold-out is determined by pipetting 2 ml. of a solvent containing the dye C.I. Solvent Red 24 on to the treated surface of base paper; after standing for 5 seconds the excess solvent is blotted off and the average number of pin holes per square inch counted on the reverse side. The solvents used are toluene and 'Isopar G' (Esso Petroleum Company).

| [Co] Polymer | | | | | |
|---|---|---|---|---|---|
| Quaternary Unit | Non-quat. Unit | Molar Ratio Quat: Non-quat. | | Number average molecular weight | Surface Resistivity (ohms) |
| $-CH_2-C(CH_3)-$<br>$\quad\|$<br>$\quad COOCH_2CH_2\overset{+}{N}Me_3$<br>$\quad\quad\quad Cl^-$ | $-CHCH_2-$<br>$\quad\|$<br>(phenyl) | 50:50<br>40:60<br>30:70<br>25:75 | | 32,000 | $5.9 \times 10^8$<br>$4.7 \times 10^8$<br>$7.1 \times 10^8$<br>$20 \times 10^8$ |
| | $\quad\quad CH_3$<br>$\quad\quad\|$<br>$-CH_2-C-$<br>$\quad\quad\|$<br>$\quad\quad COOCH_3$ | 50:50<br>40:60<br>30:70 | | 47,000 | $10.5 \times 10^8$<br>$7.0 \times 10^8$<br>$10.5 \times 10^8$ |
| $-CH_2-C(CH_3)-$<br>$\quad\|$<br>$\quad COOCH_2CH_2\overset{+}{N}Me_3$ | homopolymer<br>$Cl^-$ | | | | $5.5 \times 10^8$ |
| Untreated Paper | | | | | $3000 \times 10^8$ |

All agents are coated at 1 gm$^{-2}$ on to the same quality of 70 gm.$^{-2}$ paper.

| [Co] Polymer | | | Pin Holes per Sq.Inch | |
|---|---|---|---|---|
| Quaternary unit | Non-quat Unit | Molar ratio | Toluene | Isopar G |
| -CH₂C(CH₃)- \| COOCH₂CH₂NMe₃ Cl⁻ | -CH₂-C(CH₃)- \| COOCH₃ | 50:50<br>40:60<br>30:70 | 0.5<br>1.7<br>1 | 0.2<br>1.7<br>1 |
| | -CHCH₂- \| C₆H₅ | 50:50<br>40:60<br>30:70 | 6<br>4<br>20 | 9.5<br>4<br>18 |
| -CH₂C(CH₃)COOCH₂CH₂NMe₃Cl⁻ Homopolymer | | | 5 | 3 |
| * Poly(vinylbenzyl trimethyl ammonium chloride) | | | 14 | 15 |

The poly(vinylbenzyl trimethyl ammonium chloride) used is a commercially available product marketed as an electroconductive resin for paper and is included for comparison.

EXAMPLE 5

A range of copolymers, containing 57% of units of the formula

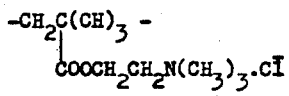

and 43% of units derived from a non-quaternary conomomer, were coated on to paper at 1 gm⁻² and the surface resisitivity measured at 20% RH and 25°C. using 500 V D.C. applied across the annular gap between 5 and 7 cm. concentric electrodes (British Standard 903). The results obtained are presented in the following table.

| Non-quaternary comonomer | Number Average Molecular weight | Surface Resistivity (ohms) |
|---|---|---|
| Styrene | ca 20,000 | $1.4 \times 10^9$ |
| vinyl toluene | 25,000 | $1.7 \times 10^9$ |
| 2-ethylhexyl acrylate | 20,200 | $2.9 \times 10^9$ |
| methyl methacrylate | ca 20,000 | $4.8 \times 10^9$ |
| diacetone acrylamide | — | $1.6 \times 10^{10}$ |
| butyl acrylate | 23,800 | $3.3 \times 10^{10}$ |
| acrylonitrile | — | $1.1 \times 10^{11}$ |
| ethyl acrylate | 20,000 | $3.5 \times 10^{11}$ |
| UNTREATED PAPER | | $2.9 \times 10^{12}$ |

EXAMPLE 6

A starch solution is prepared by making a paste from 60 parts of a cationic starch and 60 parts of water. 280 Parts of boiling water are added and the mixture is stirred for 15 minutes at 90°C. To 90 parts of the cooled starch solution is added 22.4 parts of a 36.1% aqueous solution of a trimethyl 2-methacryloyloxyethyl ammonium chloride/styrene 40:60 molar copolymer. A further 22.6 parts of water are added and the mixture stirred to give a pale coloured solution having a slight haze due to the starch.

The coating mix is applied to paper to give a coat weight of 1.5 gm⁻² of electroconductive resin per side. The surface resistivity is measured at 20% RH and 25°C. using the electrodes described in Example 5.

The treated paper has a surface resistivity of $4.1 \times 10^8$ ohm, whereas that of the untreated paper is $2.7 \times 10^{12}$ ohm.

We claim:

1. A method of improving the electroconductivity of paper which comprises applying to at least one surface of the paper an aqueous solution of a copolymer containing in the molecule 15–80% by weight of repeating units of the formula:

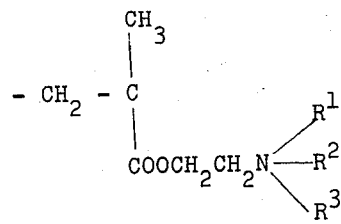

wherein $R^1$ represents methyl or ethyl, $R^2$ and $R^3$ each independently represents methyl or ethyl or $R^2$ and $R^3$ taken together represent $—CH_2CH_2OCH_2CH_2—$ or $—(CH_2)_n—$ where $n$ represents 4 or 5 and $X^-$ represents a chloride or acetate ion, the remainder of the copolymer consisting of styrene, vinyl toluene, 2-ethylhexyl acrylate or methyl methacrylate units, said copolymer having an average molecular weight in the range 5,000 to 2,000,000.

2. A method as claimed in claim 1 wherein the copolymer has an average molecular weight of from 10,000 to 500,000.

3. A method as claimed in claim 1 wherein $R^1$, $R^2$ and $R^3$ are each methyl and X is chloride.

* * * * *